(12) United States Patent
Durairaj et al.

(10) Patent No.: US 12,518,266 B1
(45) Date of Patent: Jan. 6, 2026

(54) BLOCKCHAIN BASED VERIFICATION OF ELECTRONIC ADDRESSES OR COMMUNICATION IDENTIFIERS

(71) Applicant: UIPCO, LLC, San Antonio, TX (US)

(72) Inventors: Ravi Durairaj, San Antonio, TX (US); Salvador Adrian Bretado, San Antonio, TX (US); Hanna Elizabeth Rafferty, San Antonio, TX (US); Pradeep R. Mangalagiri, Naperville, IL (US); Justin Royell Nash, Little Elm, TX (US); Marshall Hercules Felder, San Antonio, TX (US); Brian Tougas, Spring Branch, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 178 days.

(21) Appl. No.: 18/174,872

(22) Filed: Feb. 27, 2023

(51) Int. Cl.
  *G06Q 20/36* (2012.01)
  *G06Q 20/38* (2012.01)
  *G06Q 30/018* (2023.01)

(52) U.S. Cl.
  CPC ..... *G06Q 20/3672* (2013.01); *G06Q 20/3674* (2013.01); *G06Q 20/389* (2013.01); *G06Q 30/0185* (2013.01)

(58) Field of Classification Search
  CPC ........... G06Q 20/3672; G06Q 20/3674; G06Q 20/389; G06Q 30/0185
  See application file for complete search history.

(56) References Cited

U.S. PATENT DOCUMENTS

| 8,554,674 B1 | 10/2013 | Subealdea et al. |
| 8,817,961 B1 | 8/2014 | Sterman |
| 9,483,784 B2 | 11/2016 | Raney |

(Continued)

FOREIGN PATENT DOCUMENTS

| KR | 20220066842 A | * | 5/2022 | ......... H04L 63/0876 |
| WO | WO-2022231480 A2 | * | 11/2022 | ............. H04L 43/16 |

OTHER PUBLICATIONS

Sina Rafati Niya, Deti: Decentralized Ticketing Management Platform, Jul. 2022, https://pmc.ncbi.nlm.nih.gov/articles/PMC9315850/pdf/10922_2022_Article_9675.pdf (Year: 2022).*

*Primary Examiner* — Chunling Ding
(74) *Attorney, Agent, or Firm* — Potomac Law Group, PLLC; Dannon G. Allbee

(57) ABSTRACT

Aspects of the present disclosure are directed to verifying a communication identifier or electronic address using one or more blockchains. Implementations mint non-fungible tokens (NFTs) that correspond to the electronic addresses and/or communication identifiers. A person or company can communicate with third-party entities via the electronic addresses and/or communication identifiers. A given third-party entity can verify that a NFT that corresponds to the specific electronic address and/or communication identifier the given third-party is interfacing with has a corresponding minted NFT. The existence of such a minted NFT verifies that the specific electronic address and/or communication identifier has been registered with a trusted authority. The third-party entity can then safely interact with the electronic address and/or communication identifier once receiving the verification result.

19 Claims, 9 Drawing Sheets

(56) References Cited

U.S. PATENT DOCUMENTS

| | | | |
|---|---|---|---|
| 9,519,682 B1* | 12/2016 | Pujara | H04H 20/28 |
| 9,706,401 B2 | 7/2017 | Vincent et al. | |
| 10,218,695 B1 | 2/2019 | Jain | |
| 10,535,086 B2 | 1/2020 | Raman | |
| 10,958,774 B1 | 3/2021 | Harding | |
| 11,587,056 B2 | 2/2023 | Xiu et al. | |
| 2004/0153414 A1 | 8/2004 | Khaishgi et al. | |
| 2008/0181379 A1 | 7/2008 | Chow et al. | |
| 2012/0203708 A1 | 8/2012 | Psota et al. | |
| 2014/0258032 A1 | 9/2014 | Psota et al. | |
| 2015/0073929 A1 | 3/2015 | Psota et al. | |
| 2016/0217464 A1 | 7/2016 | Jajara et al. | |
| 2017/0140134 A1* | 5/2017 | Brough | A61B 5/002 |
| 2017/0142128 A1 | 5/2017 | McCormack et al. | |
| 2018/0253722 A1 | 9/2018 | Gupta | |
| 2019/0228173 A1 | 7/2019 | Gupta et al. | |
| 2019/0297075 A1 | 9/2019 | Kaladgi et al. | |
| 2019/0306158 A1 | 10/2019 | Jain | |
| 2019/0312726 A1 | 10/2019 | Sierra et al. | |
| 2019/0327226 A1 | 10/2019 | Brown et al. | |
| 2019/0356672 A1 | 11/2019 | Bondugula et al. | |
| 2019/0386984 A1 | 12/2019 | Thakkar et al. | |
| 2020/0104428 A1* | 4/2020 | Bier | H04L 9/3239 |
| 2020/0125247 A1 | 4/2020 | Benkreira et al. | |
| 2020/0372519 A1 | 11/2020 | Repaka et al. | |
| 2020/0382510 A1 | 12/2020 | Dunjic et al. | |
| 2021/0073933 A1 | 3/2021 | Punnoose et al. | |
| 2021/0092227 A1 | 3/2021 | Naujok et al. | |
| 2021/0110500 A1 | 4/2021 | Nayudu et al. | |
| 2021/0144010 A1 | 5/2021 | Tang et al. | |
| 2021/0201328 A1 | 7/2021 | Gunther | |
| 2021/0216658 A1 | 7/2021 | Watson et al. | |
| 2022/0229828 A1* | 7/2022 | Lawyer | G06F 16/345 |
| 2022/0407702 A1* | 12/2022 | Jakobsson | H04L 9/50 |
| 2023/0034169 A1* | 2/2023 | Ferenczi | H04L 9/0894 |
| 2023/0067155 A1* | 3/2023 | Jackson | H04L 9/50 |
| 2023/0241514 A1* | 8/2023 | Dalmia | A63F 13/69 |
| | | | 463/40 |
| 2023/0291570 A1* | 9/2023 | Doumar | H04L 9/3247 |
| 2024/0095720 A1* | 3/2024 | Binder | H04L 67/02 |
| 2024/0127258 A1* | 4/2024 | Brannan | G06Q 20/36 |

\* cited by examiner

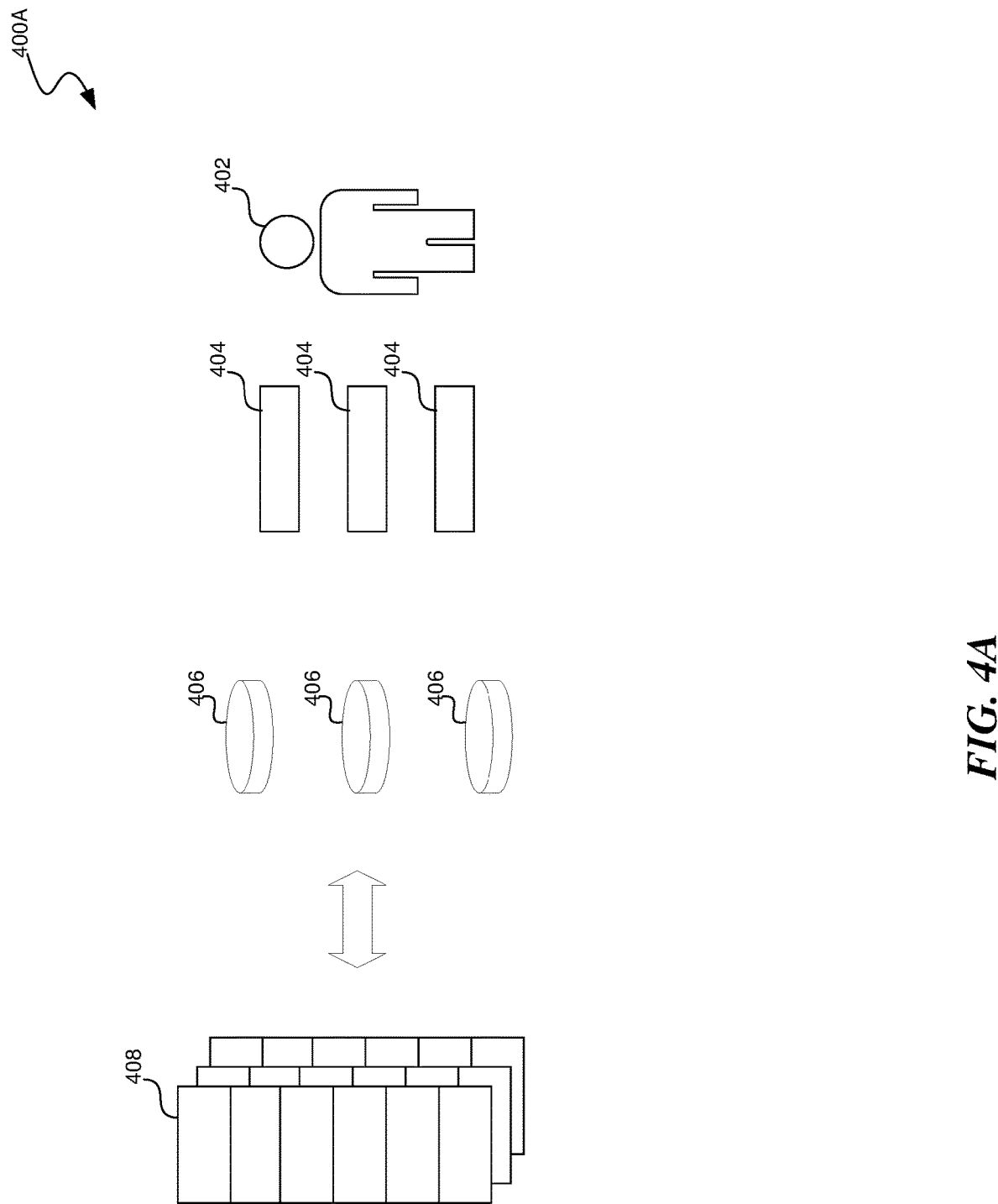

BLOCKCHAIN BASED VERIFICATION OF ELECTRONIC ADDRESSES OR COMMUNICATION IDENTIFIERS

TECHNICAL FIELD

The present disclosure is directed to verifying a communication identifier or electronic address using one or more blockchains.

BACKGROUND

A blockchain is a list of records, each called a block, which can be linked through cryptography. Each block includes a timestamp, a hash of the previous block, and transaction data. The timestamp proves that the transaction data was included when the block was added in order to get its hash. Because each block specifies the block previous to it, the set of blocks make a chain, with each new block reinforcing the set of blocks before it in the chain. Therefore, blockchains are very difficult to modify because data, once added to the blockchain, cannot be altered without altering all subsequent blocks.

Non-Fungible Tokens (NFTs), are blockchain-backed identifiers specifying a unique (digital or real-world) item. Through a distributed ledger, the ownership of these tokens can be tracked and verified. Such tokens can link to a representation of the unique item, e.g., via a traditional URL or a distributed file system such as IPFS. While a variety of blockchain systems support NFTs, common platforms that supports NFT exchange allow for the creation of unique and indivisible NFT tokens.

Traditionally, NFTs represent a way of being able to define ownership for practically anything that is digital. In other words, any material that can be digitized or which is already in a digital format can be the subject of an NFT. Some examples of NFT content can include digital photographs, video frames, social media interactions, and virtually all items that can be converted for receipt and processing by a computer (e.g., a scanned autograph). Asset ownership via digital items, such as NFTs, has grown in popularity. NFTs can include identifying information that identifies the asset tied to the NFT, such as unique identifying information, a web link, or other suitable identifying information. NFTs can be managed on a blockchain, thus providing transparency and reliability to the asset ownership. Conventional NFT are tied to digital assets, such as images, videos, digital collectibles, and the like.

BRIEF DESCRIPTION OF THE DRAWINGS

FIGS. 4A and 4B are conceptual diagrams of non-fungible tokens for electronic addresses or communication identifiers.

The techniques introduced here may be better understood by referring to the following Detailed Description in conjunction with the accompanying drawings, in which like reference numerals indicate identical or functionally similar elements.

DETAILED DESCRIPTION

Figure 1:
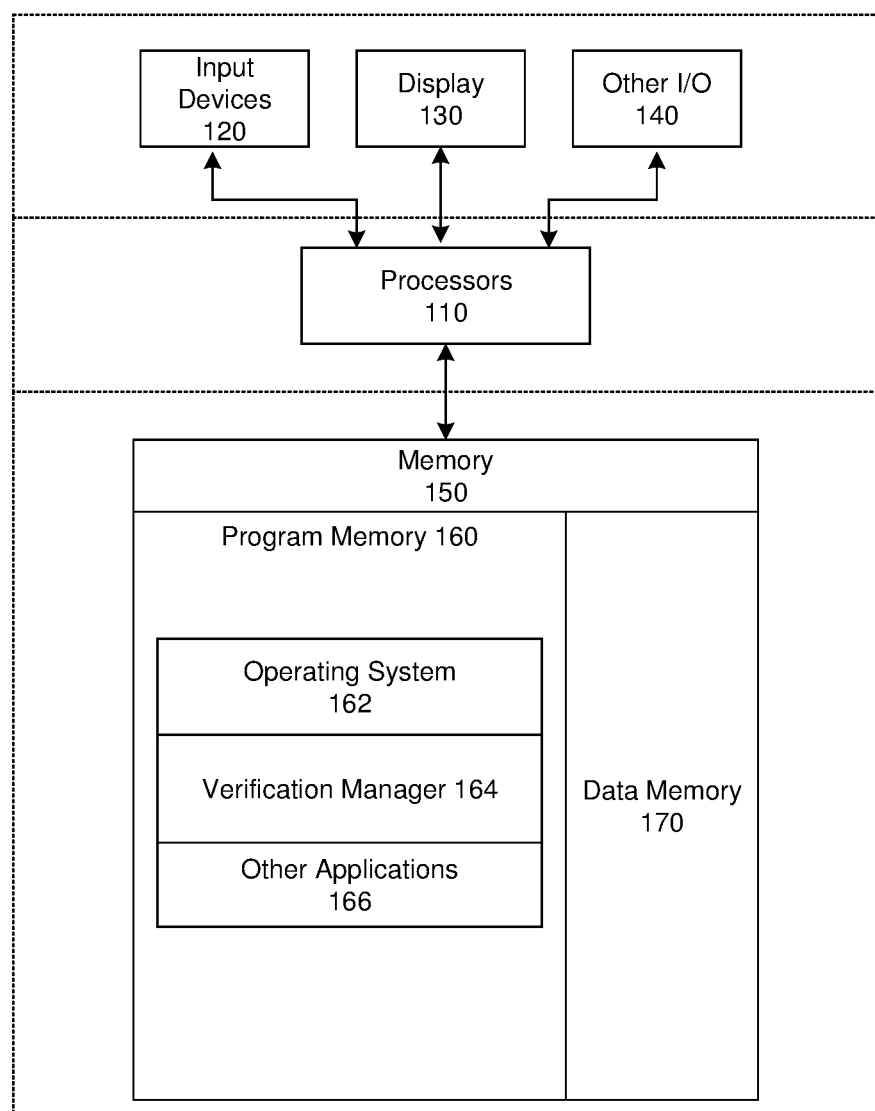
FIG. 1 is a block diagram illustrating an overview of devices on which some implementations can operate.

Aspects of the present disclosure are directed to verifying a communication identifier or electronic address using one or more blockchains. Implementations mint non-fungible tokens (NFTs) that correspond to electronic addresses and/or communication identifiers. NFTs are blockchain-backed identifiers specifying a unique item. Implementations tie NFTs to electronic addresses and/or communication identifiers to support trusted interactions between third-party entities and these electronic addresses and/or communication identifiers. For example, a person, company, or organization that owns these electronic addresses and/or communication identifiers can use them to communicate with third-party entities. Implementations provide a verification service that can reduce fraudulent attempts to impersonate these owning persons, companies, or organizations.

In some implementations, a given third-party entity can verify, via the verification service, that a NFT that corresponds to the specific electronic address and/or communication identifier, the given third-party is interfacing with, has a corresponding minted NFT. In some implementations, the existence of such a minted NFT verifies that the specific electronic address and/or communication identifier has been registered with a trusted authority. The third-party entity can then safely interact with the electronic address and/or communication identifier once receiving the verification result.

Registration with the trusted authority, such as a blockchain service, can include an authentication workflow that authenticates an owner entity, such as a person, company or organization, and the specific electronic address or communication identifier. Upon authentication, a NFT can be minted that corresponds to the specific electronic address or communication identifier, and the NFT can be managed on one or more blockchains. For examples, transactions for the NFT can be appended to the blockchain(s). In order to verify a given electronic address or communication identifier, the one or more blockchains that manage the NFTs can be queried to verify whether a NFT that corresponds to the given electronic address or communication identifier is managed by the blockchain(s).

In an example, a third-party entity can verify that a URL is registered with a trusted authority, and thus the third-party entity can safely navigate to the URL, provide identifying information while navigating the webpage(s), etc. In another example, a third-party entity can verify that a phone number or email address is registered with the trusted authority, and thus communications with the phone number of email address can be trusted (e.g., the third-party entity can trust the communications are not part of a fraudulent scheme). In another example, a third-party entity can verify that a social media identifier (e.g., social media account) is registered with a trusted authority, and thus the third-party entity can trust that the social media account is not part of a fraudulent scheme and/or is not an automated account (e.g., bot).

In some implementations, when returning a verification result that indicates a verified electronic address or communication identifier (e.g., the existence of a corresponding NFT), implementations can also provide, to the requesting third-party entity or computing device, additional communication identifiers or electronic addresses for the owner of the verified communication identifier or electronic address. For example, when a NFT is found that corresponds to the verified communication identifier or electronic address, the NFT can comprise identifying information that identifies the owner.

In some implementations, the blockchain(s) can be queried (or the index of the blockchain(s) can be queried) to locate additional NFTs that are owned by the owner of the verified electronic address or communication identifier. For example, a token wallet identifier can identify the NFTs owned by the owner entity (e.g., person, company, or organization). The blockchain(s) (e.g., transactions of the blockchain ledger) can be queried using the token wallet identifier for the owner, and the additional communication identifiers or electronic addresses that correspond to the NFTs owned by the token wallet identifier can be retrieved. These additional communication identifiers or electronic addresses can be provided to the requesting third-party entity or computing device.

For example, the listing of additional communication identifiers or electronic addresses can provide the third-party entity trust in communications/transactions involving one of the additional communication identifiers or electronic addresses. Further, the listing of additional communication identifiers or electronic addresses can improve the trusted relationship the third-party identity has with the originally verified communication identifier or electronic address.

Conventional identity verification services can authenticate certain aspects of communication, however fail to provide broad services that cover a range of electronic addresses and communication identifiers. In addition, in these conventional systems, a transparent and immutable ledger is not maintained that provides enhanced reliability.

Implementations provide NFTs that support verification of electronic addresses and/or communication identifiers. For example, a NFT that corresponds to an electronic address or communication identifier can be minted in response to authentication of a person, company, or organization, and authenticate that the person, company, or organization owns the electronic address or communication identifier. These NFTs are maintained on one or more blockchain(s), thus achieving enhanced transparency and reliability for the verification service. Moreover, implementations support a wide range of electronic addresses and communication identifiers, such as email addresses, phone numbers, fax numbers, web addresses, network computing device addresses, social application identifiers, financial application identifiers, and other suitable electronic addresses or communication identifiers.

Several implementations are discussed below in more detail in reference to the figures. FIG. 1 is a block diagram illustrating an overview of devices on which some implementations of the disclosed technology can operate. The devices can comprise hardware components of a device 100 that verify a communication identifier or electronic address using one or more blockchains. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, verification manager 164, and other application programs 166. Memory 150 can also include data memory 170, e.g., blockchain data, identifying information for a person, company, or organization, NFTs, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
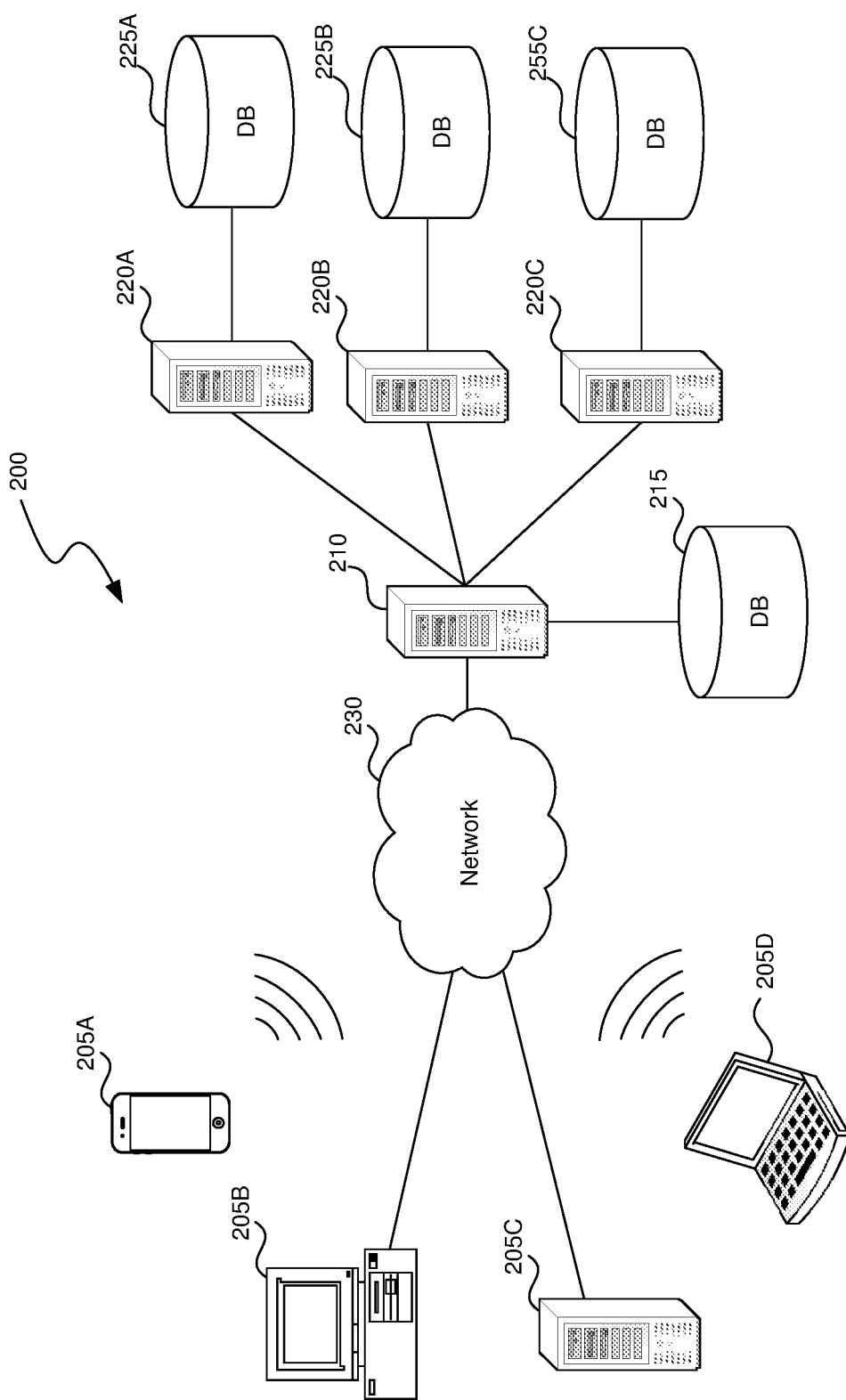
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as blockchain data, metadata for a person or thing, identifying information for an identity and/or owner, cryptographic key(s), NFTs, and other suitable information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
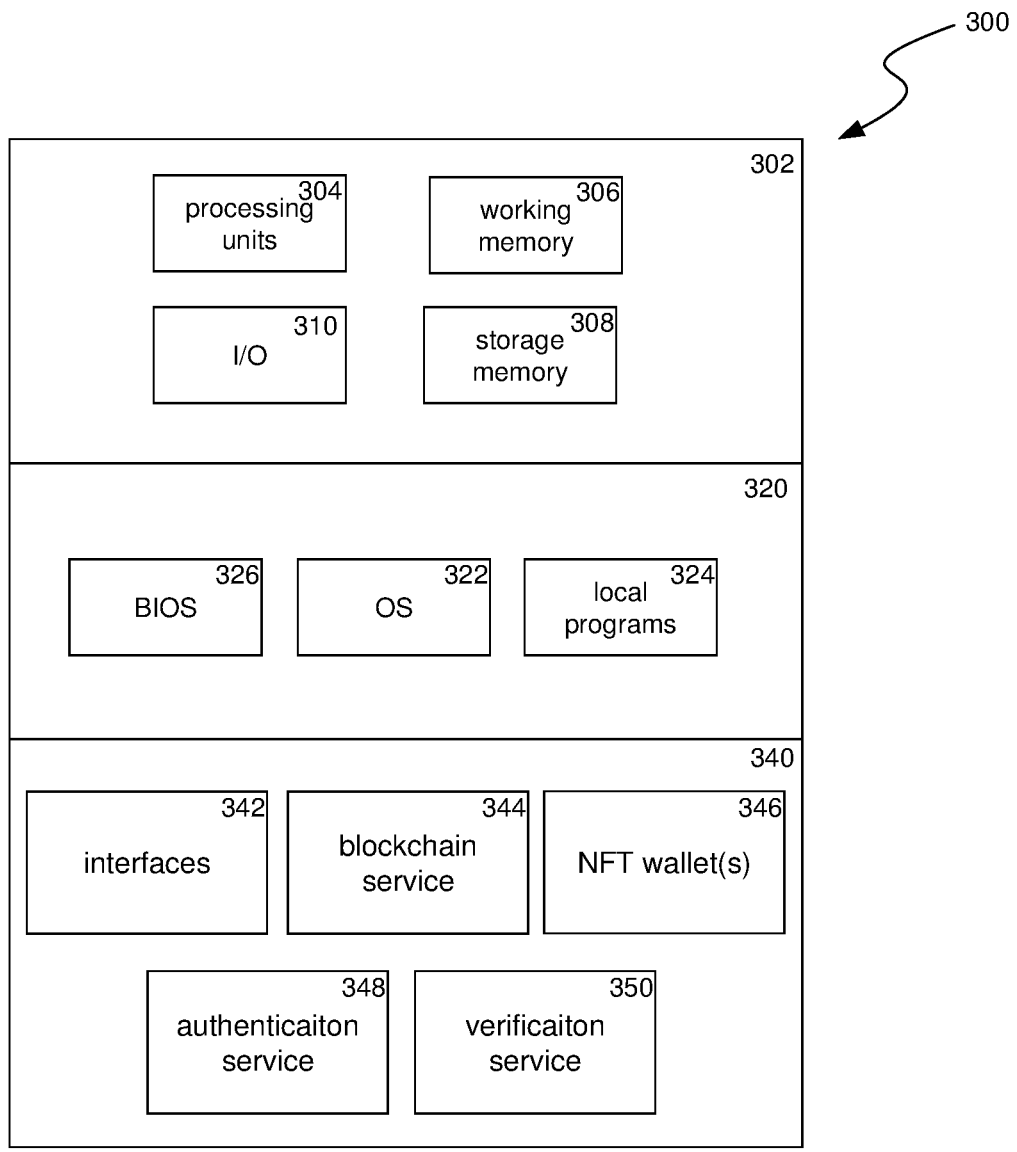
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include blockchain service 344, NFT wallet(s) 346, authentication service 348, verification service 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Blockchain service 344 can manage a blockchain that supports one or more NFTs. For example, blockchain service 344 can include one or more blockchain data structure(s) and smart contracts that execute in combination with the blockchain data structure(s). In some implementations, blockchain service 344 can manage a blockchain and smart contract(s) for a NFT that corresponds to an electronic address (e.g., email address, web address, such as a uniform resource locator (URL), etc.) or a communication identifier (e.g., phone number, social application account identifier, direct messaging identifier, financial application identifier, etc.). For example, blockchain service 344 can record transactions for the NFTs, execute smart contract(s) relative to the NFTs, and the like. Example smart contract(s) can mint a NFT on the blockchain, transfer the NFT to one of NFT wallet(s) 346, such as in response to authentication from authentication service 348, and perform any other suitable transaction.

In some implementations, NFTs minted by blockchain service 344 include the electronic address or communication identifier that corresponds to the NFT. For example, a minted NFT can comprise an email address, a hash of the email address, any other suitable representation of the email address, or any combination thereof. In some implementations, NFTs minted by blockchain service 344 include owner information for the entity that owns the electronic address or communication identifier that corresponds to the NFT. For example, a minted NFT can comprise one or more persons' identifying information (e.g., name, birthdate, birth city and/or state, social security number, address, address history, biometric information, thumbprint, eye scan, etc.), one or more companies or organizations identifying information (e.g., registered company name(s), tax identifier, portions of the articles of incorporation, public identifier(s), such as alternative names, trademarks, etc.), a hash of this identifying information, any other suitable representation of this identifying information, or any combination thereof. Additional details on blockchain service 344 are provided below in relation to FIGS. 4A, 4B, 5, blocks 510, 512, 514, 516, and 518 of FIG. 5, blocks 610, 612, and 614 of FIG. 6, and block 804 of FIG. 8.

NFT wallet(s) 346 can store NFT(s) that correspond to an electronic address or communication identifier. For example, authentication service 348 can authenticate an entity (e.g., person, company or organization, etc.) as an authenticated person, company, or organization, and, in response to authentication, blockchain service 344 can issue the entity a NFT wallet 346. Once issued, blockchain service 344 can mint NFT(s) and transfer these minted NFT(s) to the entity's NFT wallet 346. The entity's NFT wallet 346 can store the NFT(s) until a smart contract of blockchain service 344 performs a transfer of the NFT(s). Additional details on NFT wallet(s) 346 are provided below in relation to FIGS. 4A, 4B, 5, and blocks 610, 612, and 614 of FIG. 6.

Authentication service 348 can authenticate an entity identity (e.g., person identity, company identity, organization identity, etc.) and/or ownership of an electronic address or communication identifier. For example, in response to an entity request to register an electronic address or communication identifier, authentication service 350 can authenticate the requesting entity's identity and ownership of the electronic address or communication identifier. In another example, in response to a request from a known entity (e.g., pre-authenticated entity) to register an electronic address or communication identifier, authentication service 350 can authenticate the known entity as the owner of the electronic address or communication identifier. Additional details on authentication service 350 are provided below in relation to FIGS. 4A, 4B, 5, blocks 602, 604, 606, and 608 of FIG. 6, and process 700 of FIG. 7.

Verification service 350 can verify that one or more electronic addresses or communication identifiers are registered with and/or managed by blockchain service 344. For example, a third-party entity (e.g., persons, companies, organizations, etc.) can issue a verification request to verification service 350 to verify a candidate electronic address or communication identifier. Verification service 350 can issue one or more queries to blockchain service 344 to query the blockchain(s) (or indexed representations of the blockchain(s)) to locate minted NFTs and/or transactions of NFT(s) that correspond to the candidate electronic address or communication identifier. If one or more corresponding NFTs are identified, verification service 350 can verify to the requesting entity that the candidate electronic address or communication identifier is registered with blockchain service 344. In some implementations, the verification service can be a local service, e.g., to perform CAPTCHA or other ventilation that a current user is not a bot. Additional details on verification service 350 are provided below in relation to FIGS. 4A, 4B, 5, and process 800 of FIG. 8.

A blockchain is a list of records, each called a block, which can be linked through cryptography. In some blockchain implementations, each block includes a timestamp, a hash of the previous block, and transaction data. The timestamp proves that the transaction data was included when the block was added in order to get its hash. Because each block specifies the block previous to it, the set of blocks make a chain, with each new block reinforcing the set of blocks before it in the chain. Therefore, blockchains can be difficult to modify because data, once added to the blockchain, cannot be altered without altering subsequent blocks.

Non-Fungible Tokens (NFTs) are blockchain-backed identifiers specifying a unique item. Through a distributed ledger (e.g., blockchain), the ownership of these tokens can be tracked and verified. Such tokens can include an identifier of the unique item and/or link to a representation of the unique item (e.g., via a traditional URL or a distributed file system such as IPFS). While a variety of blockchain systems support NFTs, common platforms that supports NFT exchange allow for the creation of unique and indivisible NFTs.

In some implementations, a blockchain service can mint NFT(s) according to any suitable NFT protocol (e.g., Ethereum request for Comments ("ERC")-20, ERC-721, ERC-1155, protocols for other suitable blockchain implementations, etc.). The blockchain service can include an application programming interface ("API") for performing transactions relative to the NFT. For example, the blockchain service can include a set of smart contracts for performing transactions relative to the NFT. A smart contract can be code that executes when a set of conditions are satisfied. The blockchain service maintains the transactions on a blockchain ledger according to the NFT protocol.

Implementations mint NFTs that correspond to electronic addresses and/or communication identifiers. For example, a person or company can communicate with third-party entities via the electronic addresses and/or communication identifiers. A given third-party entity can verify that a NFT that corresponds to the specific electronic address and/or communication identifier the given third-party is interfacing with has a corresponding minted NFT. In some implementations, the existence of such a minted NFT verifies that the specific electronic address and/or communication identifier has been registered with a trusted authority. The third-party entity can then safely interact with the electronic address and/or communication identifier once receiving the verification result.

Registration with the trusted authority, such as a blockchain service, can include an authentication workflow that authenticates an owner entity, such as a person, company or organization, and the specific electronic address or communication identifier. Upon authentication, a NFT can be minted that correspond to the specific electronic address or communication identifier, and the NFT can be managed on one or more blockchains. For examples, transactions for the NFT can be appended to the blockchain. In order to verify a given electronic address or communication identifier, the one or more blockchains that manage the NFTs can be queried to verify whether a NFT that corresponds to the given electronic address or communication identifier is managed by the blockchain.

In an example, a third-party entity can verify that a URL is registered with a trusted authority, and thus the third-party entity can safely navigate to the URL, provide identifying information while navigating the webpage(s), etc. In another example, a third-party entity can verify that a phone number or email address is registered with the trusted authority, and thus communications with the phone number of email address can be trusted (e.g., the third-party entity can trust the communications are not part of a fraudulent scheme).

Figure 4B:
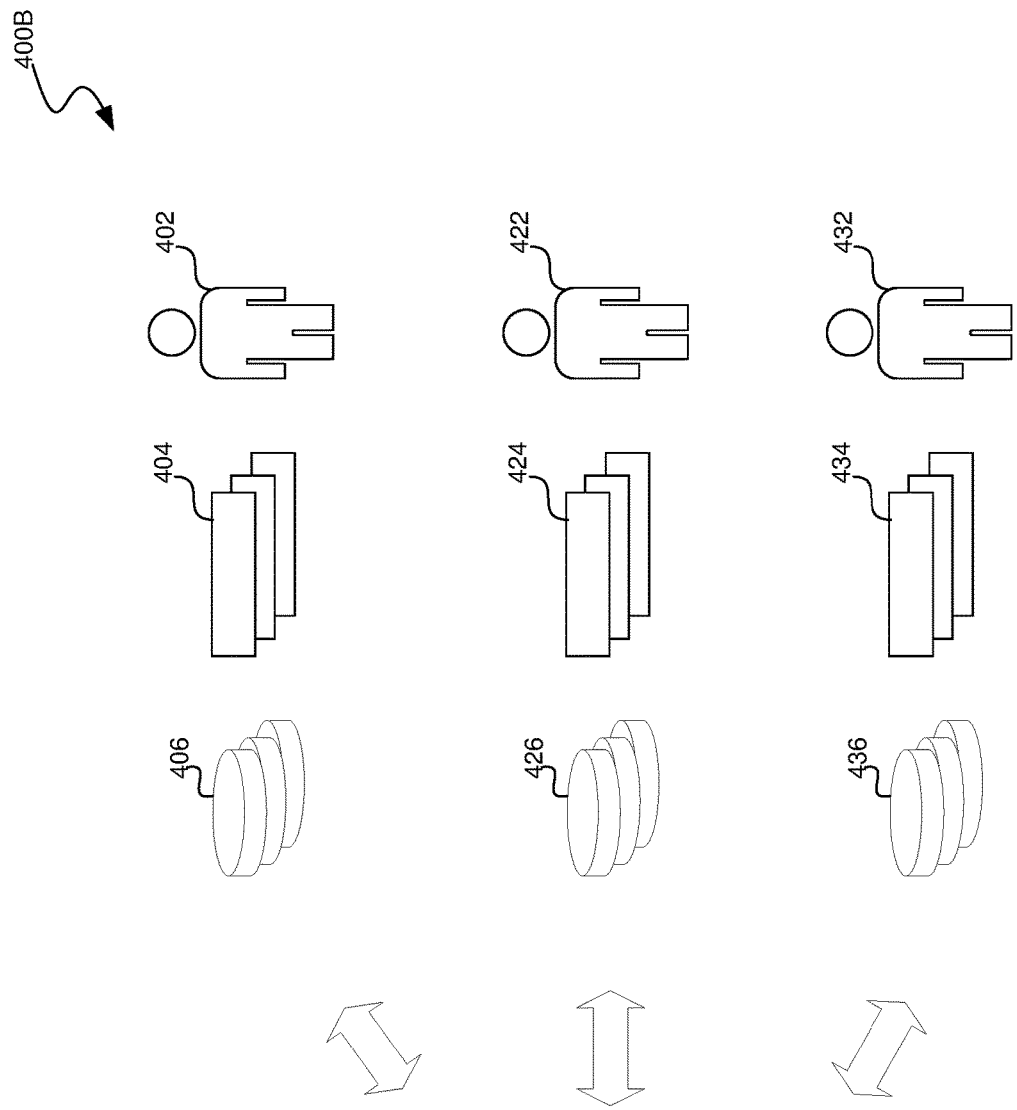

FIGS. 4A and 4B are conceptual diagrams of non-fungible tokens for electronic addresses or communication identifiers. Diagram 400A includes entity 402, items 404, NFTs 406, and blockchain(s) 408. Entity 402 can be a person, company, organization, or any other suitable entity. Items 404 can be communication addresses and/or electronic identifiers owned by entity 402. Example electronic addresses include an email address, web address, such as a uniform resource locator (URL) or uniform resource identifier (URI), a network address for a computing device (e.g., Internet Protocol (IP) address, File Transfer Protocol (FTP) address, Media Access Control (MAC) address, or other suitable network address), any publicly accessible electronic address, any other suitable electronic address, or any combination thereof. Example communication identifiers include a phone number, fax number, social application identifier (e.g., username, handle, account identifier, etc.), direct messaging identifier, financial application identifier, any other suitable identifier relative to an application that permits communication among users, or any combination thereof.

In some implementations, entity 402 can communicate with third-party entities via items 404. Example communications include sending and/or receiving messages, sending and/or receiving emails, social media posts, phone calls, text messages, and any other suitable communications. In some implementations, entity 402 can post publicly accessible data or content via items 404, such as via a web address (e.g., URL, URI, etc.), computing device network address, or any other suitable electronic address. Third-party entities can access the data or content posted by entity 402.

Because third-party entities may retrieve or receive communications, data, and/or content from entity 402 via items 404, verification that entity 402 and/or one or more of items 404 are registered with a trusted authority can improve the security of the communications. In the illustrated example, each of items 404 is registered with a trusted authority (e.g., blockchain service), and thus each of items 404 comprises a corresponding minted NFT 406. One or more blockchains 408 can manage NFTs 406. For example, transactions for NFTs 406 can be appended to blockchain(s) 408. The existence of a given NFT 406 that corresponds to a given item 404 confirms that the item is registered with the trusted authority. Blockchain(s) 408 can be queried to confirm the existence of NFTs 406.

Diagram 400B includes entities 402, 422, and 432, items 404, 424, and 434, NFTs 406, 426, and 436, and blockchain(s) 408. Diagram 400B demonstrates that multiple entities 402, 422, and 432 can each comprise multiple items 404, 424, and 434 with corresponding NFTs 406, 426, and 436, that are managed at blockchain(s) 408. Accordingly, blockchain(s) 408 can be queried to confirm that any of items 404, 424, and 434 comprises a managed NFT and thus is registered with the trusted authority. Implementations of blockchain(s) 408 can manage NFTs for a variety of different types of electronic addresses and/or communication identifiers owned by a variety of different persons, companies, and/or organizations.

Figure 5:
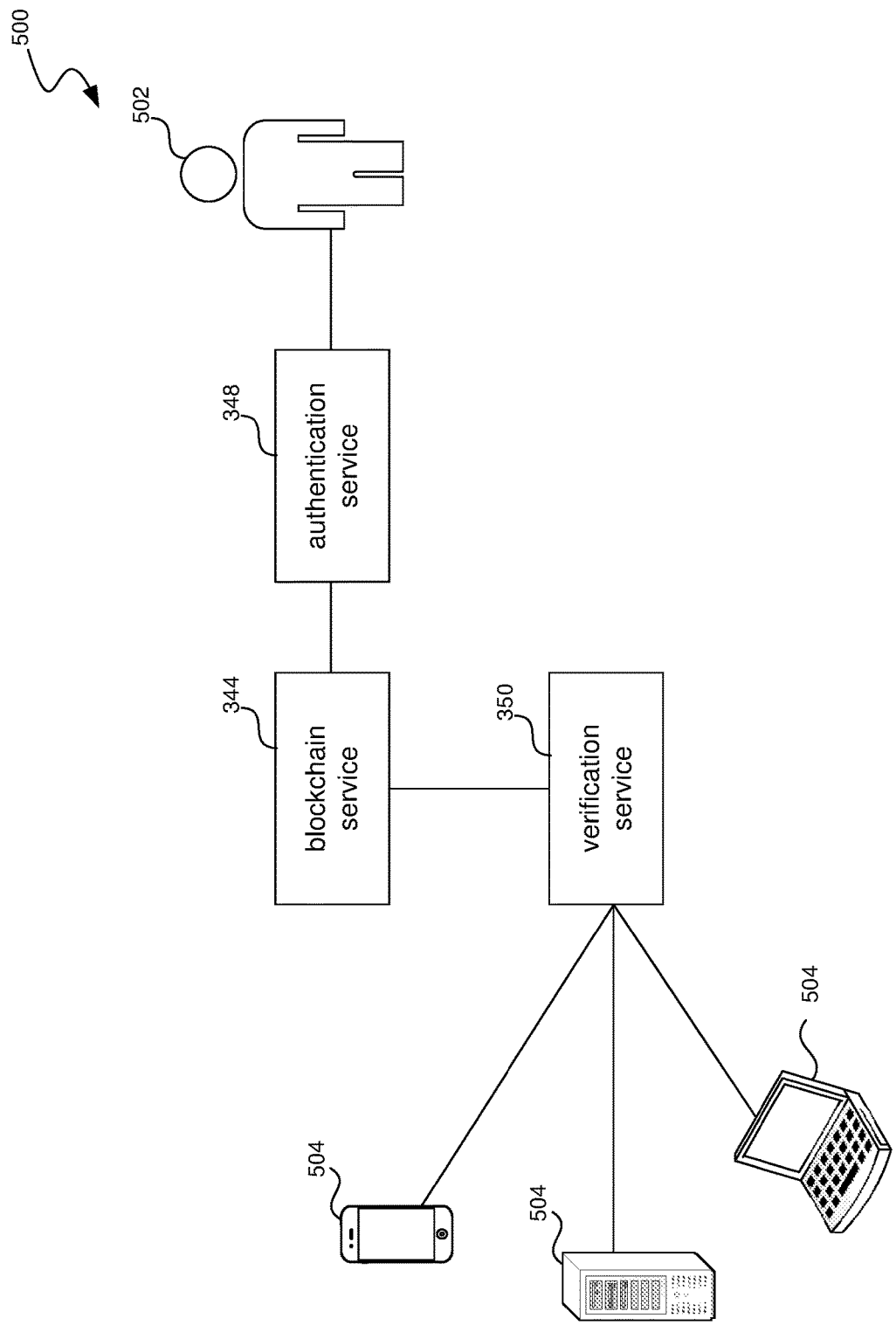
FIG. 5 is a system diagram for verifying electronic addresses or communication identifiers using a blockchain service and non-fungible tokens.

FIG. 5 is a system diagram for verifying electronic addresses or communication identifiers using a blockchain service and non-fungible tokens. System 500 includes entity 502, requesting devices 504, and authentication service 348, blockchain service 344, and verification service 350 from FIG. 3. Authentication service 348 can authenticate an identity for entity 502 (e.g., person identity, company identity, organization identity, etc.), ownership of one or more electronic addresses or communication identifiers, or provide non-bot verification. Blockchain service 344 can, in response to authentication by authentication service 348, mint one or more NFTs that correspond to the owned electronic addresses or communication identifiers, or a token showing non-bot status. In some implementations, blockchain service 344 can transfer the minted NFT(s) to the token wallet of entity 502 (e.g., the owner of the electronic addresses or communication identifiers). Blockchain service 344 can also manage the transactions for the minted NFTs, such as by appending the transactions to one or more blockchains.

Verification service 350 can receive requests to verify electronic addresses and/or communication identifiers from requesting devices 504 (e.g., third-party entities). Requesting devices 504 can be laptops, desktops, smartphones, tablets, Internet of Things devices, smart home devices, or any other suitable computing device. The users of requesting devices 504 that issue the verification requests can be one or more third-part entities (e.g., persons, companies, organizations, etc.) that seek verification of electronic addresses, communication identifiers, or non-bot status, prior to (or in furtherance of) interactions with them.

Verification service 350 can verify that the electronic addresses and/or communication identifiers from the verification requests comprise a NFT managed by one or more blockchains of blockchain service 344. For example, verification service 350 can provide the electronic addresses, communication identifiers, or proof of non-bot status from the requests to blockchain service 350 such that the blockchain(s) can be queried against them. When a NFT corresponds to a given electronic addresses, communication identifier, or proof of non-bot status, is managed on the blockchain(s), verification service 350 can verify the given electronic address, communication identifier, or status. When a NFT that corresponds to a given electronic addresses, communication identifier, or status is not found on the blockchain(s), verification service 350 can reject verification of the given electronic addresses, communication identifier, or status.

The third-party entity users of requesting devices 504 can configure their interactions with the user, electronic addresses, and/or communication identifiers in response to the verification responses. For example, a third-party entity may elect not to interact with (or choose to discontinue interaction with) an unverified electronic address, communication identifier, or user with an unverified status. In another example, a third-party entity may elect to provide sensitive information to a verified electronic address and/or communication identifier to complete a given sequence (e.g., registration workflow, purchase, etc.).

Those skilled in the art will appreciate that the components illustrated in FIGS. 1-3, 4A, 4B, and 5 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 6:
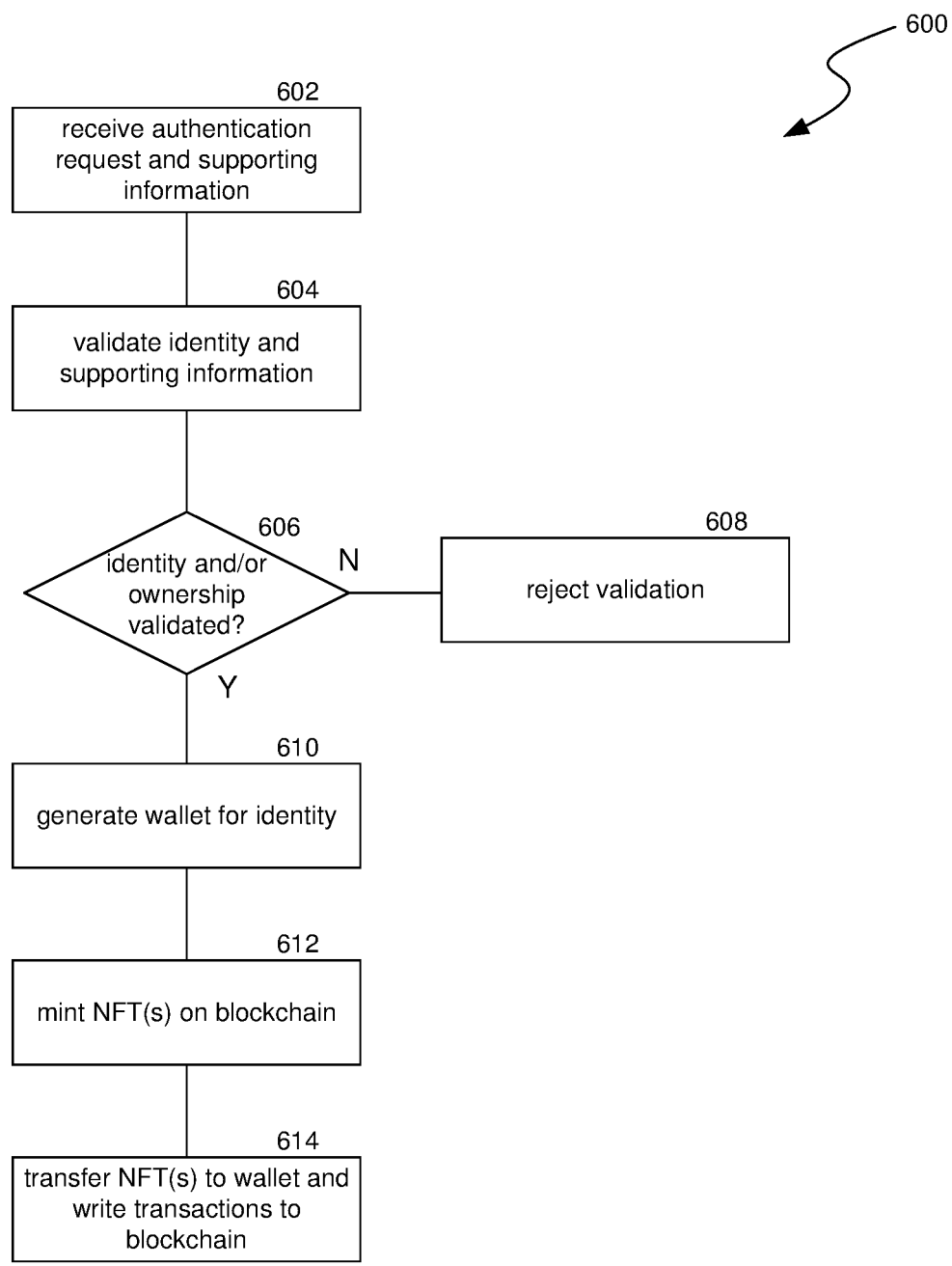
FIG. 6 is a flow diagram illustrating a process used in some implementations for authenticating an owner, electronic address, and/or communication identifier for issuance of a non-fungible token.

FIG. 6 is a flow diagram illustrating a process used in some implementations for authenticating an owner, electronic address, and/or communication identifier for issuance of a non-fungible token. In some implementations, process 600 can be performed in response to a request to register an electronic address, a request to register a communication identifier, and/or a request to authenticate an owner entity. Portions of process 600 can be performed by a blockchain service, an authentication service, or any combination thereof.

At block 602, process 600 can receive an authentication request and supporting information. The authentication request can include identifying information for a person, company, or organization, and one or more electronic addresses and/or communication identifiers. For example, a request to authenticate a specific person, company, or organization can include identifying information that supports the request.

Example identifying information that supports a request to authenticate a specific person identity can include one or more images, a video, a social security number, birth date, financial information, a thumbprint, multiple forms of photo identification credentials, employment history, tax history, education history, residence history, an eye or body scan, biometric information, or any other suitable personal identification information. Example identifying information that supports a request to authenticate a company or organization can include company or organization tax records, portions of the articles of incorporation or other company or organization origination records, employee listings or records, executed company or organization contract(s), executive personnel statements, images, recordings, other executive information, or any other suitable company or organization identification information.

In some implementations, the authentication request can include a request to authenticate the person, company, or organization as the owner of an electronic address and/or communication identifier. Example electronic addresses include an email address, web address, such as a uniform resource locator (URL) or uniform resource identifier (URI), a network address for a computing device (e.g., Internet Protocol (IP) address, File Transfer Protocol (FTP) address, Media Access Control (MAC) address, or other suitable network address), any publicly accessible electronic address, any other suitable electronic address, or any combination thereof. Example communication identifiers include a phone number, fax number, social application identifier (e.g., username, handle, account identifier, etc.), direct messaging identifier, financial application identifier, any other suitable identifier relative to an application that permits communication among users, or any combination thereof.

In some implementations, information that supports the request to authenticate the person, company, or organization as the owner can be received along with the request. Example supporting information can include domain name registration records, bills for service (e.g., phone bill, domain name registration bill, etc.), and other suitable supporting information. In some implementations, multi-factor authentication can be performed with the electronic address and/or communication identifier. For example, the authentication service can transmit a message or other communication to the electronic address and/or communication identifier (or submit data via a web form on a webpage/URL), and prompt for validation that the message or communication was received by the person, company, or organization. The message or communication can comprise a code (e.g., alphanumeric code) that the person, company, or organization can provide back to the authentication service to demonstrate ownership over the electronic address and/or communication identifier.

At block 604, process 600 can validate the identifying and/or supporting information. For example, an authentication service can validate the person, company, or organization from the request. In some implementations, validation can include comparing the received information to one or more criteria. For example, to validate the identity of a person, the criteria for identifying information can include: two forms of picture identification, social security number, birth date, employment history, residential history, and two or more of tax records, mortgage or bank accounts records, or utility bills. In another example, to validate the identity of a company or organization, the criteria for identifying information can include: multiple years of tax records, executive personnel statements, executed company or organization contract(s), images, recordings, or any other suitable company or organization identifying information.

In another example, to validate a person, company, or organization as an owner of an electronic address or communication identifier, the criteria for supporting information can include: service bill(s), registration certification(s), multi-factor authentication relative to the requested electronic address or communication identifier, or any other suitable supporting information. In some implementations, the criteria to validate ownership of an electronic address or communication identifier can include portions or all of the criteria to validate identity.

In some implementations, the validation can include authentication of individual elements of the received identifying information or supporting information. For example, the authentication service can authenticate one or more of: a picture identification of a user (e.g., government issued state identification, such as a driver's license or passport), tax records, registration records, employment records, residential history, and the like. In some implementations, a background check (e.g., automated search of databases, manual search of public data, etc.) can authenticate one or more individual elements of the received identifying/supporting information. In another example, the provided identifying/supporting information can be compared to a template, such as a template for a state issued identification (e.g., passport, driver's license, etc.) to determine authenticity. In some implementations, a computer vision machine learning model can be trained to detect the authenticity of state issued identification, and the computer vision model can output a predicted authenticity. In some implementations, company or organization records can be compared to publicly available records reported by the company or organization to validate the authenticity of supporting records.

At block 606, process 600 can determine whether the identity and/or ownership is verified. For example, the authenticity of individual elements of the received identifying/supporting information can be assessed and the overall information can be compared to one or more criteria to assess whether the received information is sufficient to establish: the identity of a person, company, or organization; and/or ownership of one or more electronic addresses and/or communication identifiers. When the authenticity of individual elements of the received information is verified and the totality of the received information meets the one or more criteria, the identity and/or ownership can be verified.

When the identity and/or ownership is verified, process 600 can progress to block 610. When the identity and/or ownership is not verified, process 600 can progress to block 608, where the identity or owner validation can be rejected. For example, the request for validation, authentication, and/or a NFT can be rejected. In some implementations, a message that describes the validation results can be transmitted to the requesting entity/computing device.

At block 610, process 600 can generate a wallet for the requesting person, company, or organization. For example, a blockchain service can generate the wallet for the requesting person, company, or organization in response to the authentication performed by the authentication service. In some implementations, the authentication service can generate a call (e.g., API call) that comprises the request and an authentication result (e.g., verification indicator) that initiates the generation of the token wallet for the person, company, or organization.

In some implementations, the authentication service can comprise a blockchain wallet and/or a token issued by the blockchain service. For example, the authentication service and blockchain service can comprise an existing trusted relationship. In some implementations, the blockchain service can issue a token to the authentication service, such as a unique token (e.g., NFT or other suitable token) that identifies the token holder as an authentication service. In this example, the blockchain service can also generate a token wallet for the authentication service such that the issued token can be stored at the token wallet.

A call (e.g., smart contract call, API call, or any other suitable call) from the authentication service to the blockchain service can initiate the generation of the token wallet for the requesting person, company, or organization. For example, the call can include the initial request (e.g., received at the authentication service), the authentication service token, an identifier for the token wallet issued to the authentication service, or any other suitable information. The blockchain service can trigger generation of the token wallet for the requesting person, company, or organization in response to the call that includes credentials from the trusted authentication service (e.g., unique token, token wallet identifier, etc.).

At block 612, process 600 can mint a NFT on a blockchain that corresponds to an electronic address and/or communication identifier. For example, the minted NFT can include identifying information about the electronic address and/or communication identifier, such as a phone number, email address, URL or URI, web domain, application identifier or handle (e.g., social application identifier, financial application identifier, direct messaging identifier, etc.), or any other suitable identifying information.

In some implementations, the minted NFT can also include identifying information for the person, company or organization that owns the electronic address and/or communication identifier (e.g., authenticated owner). Example identifying information for a person owner included in the minted NFT can include name, birthdate, hash of a PIN or portion of a social security number, image of the person, or any other suitable identifying information for a person. Example identifying information for a company or organization owner included in the minted NFT can include corporate or organization name(s), trademark(s), tax identifiers, or any other suitable identifying information for a company or organization.

At block 614, process 600 can transfer the minted NFT to the generated token wallet for the requesting person, company, or organization, and write the transaction to a blockchain. For example, the blockchain service can transfer the minted NFT to the token wallet generated for the person, company, or organization, and append a block to one or more blockchain(s) that comprises a ledger of transactions for the minted NFT. The transfer of the minted NFT and appending of the transaction to the blockchain can be part of a smart contract triggered by a call from the authentication service and/or the request from the person, company, or organization.

Figure 7:
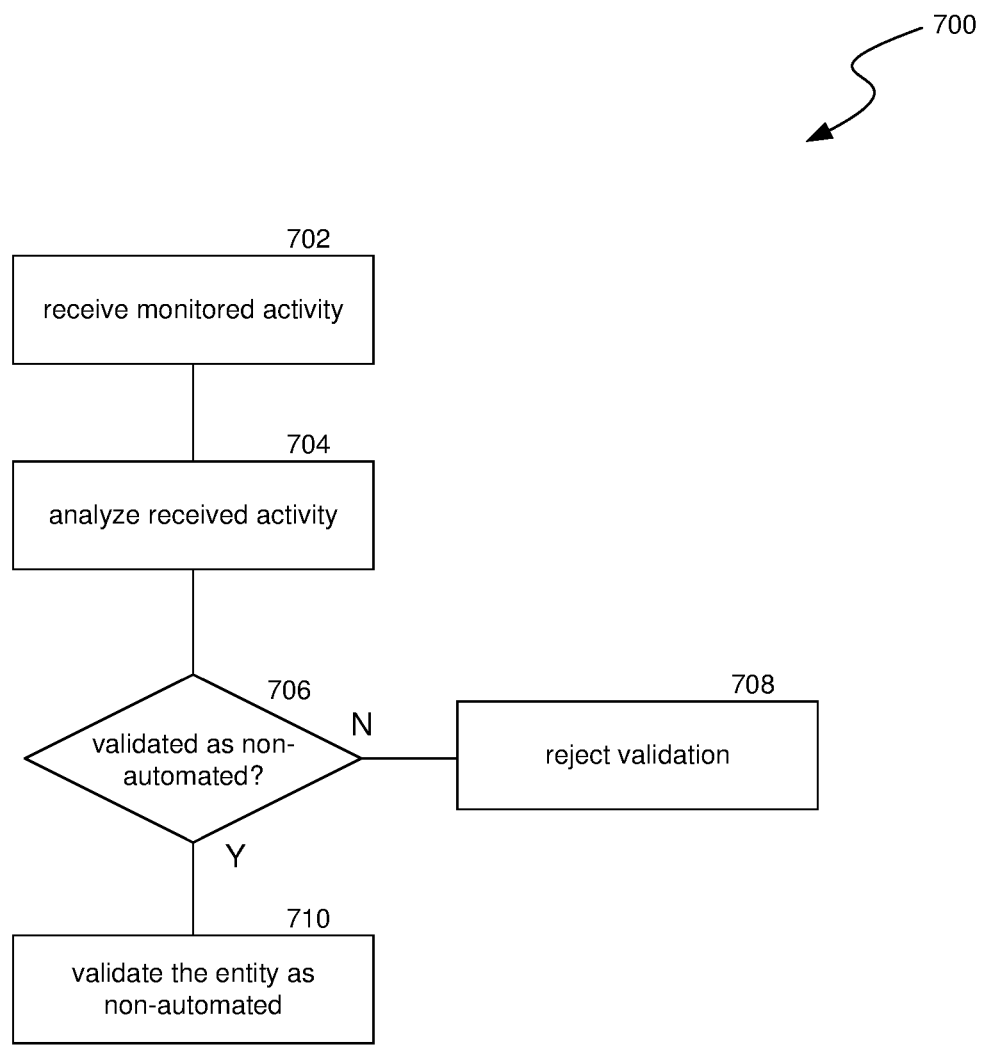
FIG. 7 is a flow diagram illustrating a process used in some implementations for authenticating an entity, electronic address, and/or communication identifier as non-automated.

FIG. 7 is a flow diagram illustrating a process used in some implementations for authenticating an entity, electronic address, and/or communication identifier as non-automated. In some implementations, process 700 can be performed in response to a request to register an electronic address, a request to register a communication identifier, and/or a request to authenticate an owner entity. Process 700 can be performed by an authentication service at any suitable computing device. In some implementations, process 700 can be a part of process 600 to authenticate a person, company, or organization.

At block 702, process 700 can receive monitored online activity for an entity. For example, the entity can be a user that is a candidate person, and the user's online activity can be monitored by one or more software elements. In some implementations, the candidate person can be one or more persons affiliated with a company or organization, such as a person that manages the digital presence for a company or organization.

In some implementations, a web browser (e.g., browser plug-in, third party software, etc.) can log user activity, such as websites visited, website actions taken, user click stream, and other suitable web browser actions. In another example, the user's financial institution can log the user's financial activity, such as credit card purchases (e.g., online purchases, in-store purchases, purchase locations, etc.) banking activity (e.g., deposits, withdrawals, in-person transactions, payments, etc.), and other suitable financial activity.

In another example, the user's social media activity can be logged, such as posts, actions (e.g., likes, reposts, links, etc.), connections (e.g., friends, users followed, users unfollowed, etc.), content viewed, and other suitable social media activity. In another example, a user's email and/or messaging activity can be logged, such as emails/messages read, emails/messages sent, emails/messages read without reply, and other suitable email or messaging activity. One or more of the user's logged web activity, financial activity, social media activity, email or messaging activity, or any combination thereof can be received by the authentication service.

At block 704, the received user activity can be analyzed. For example, the authentication service can analyze the received user activity using one or more models, metrics, thresholds, or any other suitable analytical framework. For example, thresholds or metrics for expected person web browser activity (or certain types of web browser activity), social media activity (or certain types of social media activity), financial activity (or certain types of financial activity, such as in-person transactions), and/or email/messaging activity (or certain types of email/messaging activity) can be predefined. The received user activity can be compared to the metric(s) or threshold(s) to distinguish between automated activity and person activity.

In some implementations, one or more machine learning models can be trained using training data to distinguish automated activity from person activity. For example, the one or more machine learning models can be trained using instances of activity logs (e.g., web browser activity, social media activity, financial activity, email/messaging activity, etc.) and labels that identify each activity log instance as automated or non-automated. In some implementations, different machine learning models can be trained to distinguish automated activity from person activity by different sets of training data that correspond to each type of activity (e.g., web browser activity, social media activity, financial activity, email/messaging activity, etc.) and/or a single machine learning model can be trained to distinguish automated activity from person activity across multiple activity types.

At block 706, process 700 can determine whether the entity activity is authenticated as non-automated. For example, based on the entity activity comparisons with predefined metric(s)/threshold(s), predictions output from one or more trained machine learning models, or any other suitable analytics, the entity activity can be determined to be automated activity or non-automated (e.g., person) activity. When the entity activity is authenticated as non-automated, process 700 can progress to block 710. When the entity activity is not authenticated as non-automated, process 700 can progress to block 708, where the entity validation can be rejected. For example, the request to validate and register that the entity as not automated can be rejected. In some implementations, a message that describes the validation results can be transmitted to the requesting entity/computing device.

At block 710, process 700 can validate the entity as a non-automated entity. For example, the authentication service can authenticate the identity of one or more persons, companies, or organizations, and a part of this workflow can include authenticating that the entity activity provided by the persons, companies, or organizations comprises non-automated (i.e., non-bot) activity.

Figure 8:
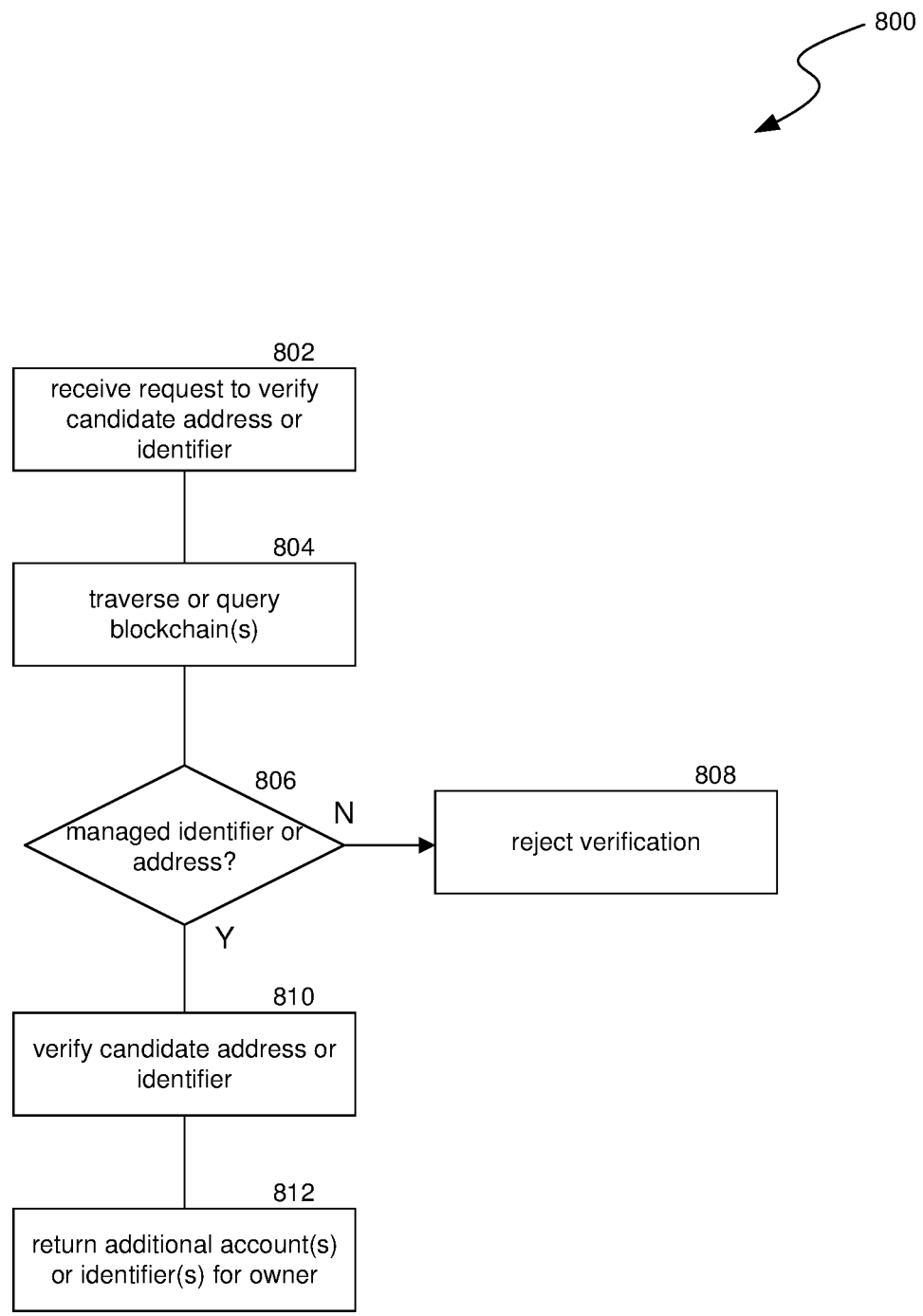
FIG. 8 is a flow diagram illustrating a process used in some implementations for verifying an electronic address or communication identifier using one or more blockchains.

FIG. 8 is a flow diagram illustrating a process used in some implementations for verifying an electronic address or communication identifier using one or more blockchains. In some implementations, process 800 can be performed in response to a request to verify an electronic address or communication identifier. Portions of process 800 can be performed by a verification service, a blockchain service, or any combination thereof.

At block 802, process 800 can receive a request to verify a candidate communication identifier or electronic address against one or more blockchains. For example, a third-party entity (e.g., person, company, organization, etc.) can submit, via a computing device, a request to verify a candidate communication identifier or electronic address. The third-party entity may seek verification that the candidate communication identifier or electronic address is trusted, is not part of a fraudulent scheme, and/or has undergone an authenticity workflow. Such verification can enhance the security of communications/transactions between the third-party entity and the candidate communication identifier or electronic address.

At block 804, process 800 can traverse the one or more blockchains relative to the candidate communication identifier or electronic address. For example, the one or more blockchains can be queried against the candidate communication identifier or electronic address. The blockchain(s) can be traversed to locate a NFT that corresponds to the candidate communication identifier or electronic address. In some implementations, the NFTs managed by the blockchain(s) can comprise identifying information that corresponds to the communication identifiers or electronic addresses tied to the NFTs.

In some implementations, traversing the blockchain(s) can include locating transaction(s) for a NFT that includes identifying information for the communication identifier or electronic address. In another example, an index can be maintained that stores a representation of the communication identifiers or electronic addresses that comprise NFTs managed by the blockchain(s). In some implementations, the index can be periodically validated against the blockchain ledger(s) to ensure accurate representation.

At block 806, process 800 can determine whether the candidate communication identifier or electronic address is managed by the blockchain(s). For example, if a NFT (e.g., transactions for the NFT) that corresponds to the candidate communication identifier or electronic address is found on the blockchain(s), it can be determined that the candidate communication identifier or electronic address is managed by the blockchain(s). If a NFT (e.g., transactions for the NFT) that corresponds to the candidate communication identifier or electronic address is not found on the blockchain(s), it can be determined that the candidate communication identifier or electronic address is not managed by the blockchain(s).

When the candidate communication identifier or electronic address is managed by the blockchain(s), process 800 can progress to block 810. When the candidate communication identifier or electronic address is not managed by the blockchain(s), process 800 can progress to block 808, where the candidate communication identifier or electronic address verification can be rejected. In some implementations, a message that describes the verification results can be transmitted to the requesting entity/computing device.

At block 810, process 800 can verify the candidate communication identifier or electronic address. For example, a verification result can be provided to the requesting third-party entity (e.g., person, company, or organization) or computing device. The verification result can indicate that the candidate communication identifier or electronic address is verified when a corresponding NFT is located or that the candidate communication identifier or electronic address is not verified when a corresponding NFT is not located. In some implementations, an identifier for the NFT can be provided along with the verification result.

At block 812, process 800 can return, to the requesting third-party entity or computing device, additional communication identifiers or electronic addresses for the owner of the candidate communication identifier or electronic address. For example, when a NFT is found that corresponds to the candidate communication identifier or electronic address, the NFT can comprise identifying information that identifies the owner.

In some implementations, the blockchain(s) can be traversed/queried (or the index of the blockchain(s) can be traversed/queried) to locate additional NFTs that are owned by the owner of the candidate electronic address or communication identifier. For example, a token wallet identifier can identify the NFTs owned by the owner entity (e.g., person, company, or organization). The blockchain(s) (e.g., transactions of the blockchain ledger(s)) can be queried using the token wallet identifier for the owner, and the additional communication identifiers or electronic addresses that correspond to the NFTs owned by the token wallet identifier can be retrieved. These additional communication identifiers or electronic addresses can be provided to the requesting third-party entity or computing device.

For example, the listing of additional communication identifiers or electronic addresses can provide the third-party entity trust with communications/transactions involving one of the additional communication identifiers or electronic addresses. Further, the listing of additional communication identifiers or electronic addresses can improve the trusted relationship the third-party identity has with the candidate communication identifier or electronic address.

In some implementations, a candidate communication identifier or electronic address can be verified when the blockchain(s) indicate the NFT has not been transferred from an original token wallet to a new token wallet. For example, once a NFT is minted, it can be transferred to an original token wallet (e.g., the token wallet of the original owner). Implementations can verify the candidate communication identifier or electronic address when its corresponding NFT is still owned by the original owner (e.g., stored in the original taken wallet). In some implementations, this workflow can include comparing the transactions for the NFT to a threshold (e.g., one, two, etc.). The threshold can be configured based on the number of transactions involved with transferring the NFT to the original token wallet.

In some implementations, transfer of the NFT from the original token wallet to a new token wallet can be permitted. For example, a candidate communication identifier or electronic address that corresponds to a NFT that has been transferred from an original token wallet to a new token wallet can nonetheless be verified. In some implementation, such a transfer can be secured using a private key. For example, an original owner for a NFT can be issued a private key upon authentication (e.g., when the owner identity is authenticated, and the owner identity is authenticated as the owner of the communication identifier or electronic address that corresponds to the NFT). A blockchain service can permit a request to transfer ownership of the NFT from an original token wallet to a new token wallet when the request is signed by the private key issued to the owner of the NFT/corresponding communication identifier or electronic address. For example, such a request can trigger a smart contract that executes the transaction and appends the transaction to the blockchain(s).

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for verifying a communication identifier using one or more blockchains, the method comprising:
   monitoring online activity corresponding to users associated with requests of identity authentication, wherein the online activity comprises web browser activity, social media activity, email or messaging activity, financial activity, or any combination thereof;
   authenticating user identities by validating that online activity corresponding to a portion of the users comprises non-automated online activity, wherein the online activity for the portion of the users is validated as non-automated based on the monitored online activity;
   generating user token wallets for the portion of the users, in response to validating that the online activity corresponding to the portion of the users comprises the non-automated online activity;
   minting, on one or more blockchains, multiple non-fungible tokens (NFTs) that each comprise a communication identifier corresponding to one of the portion of the authenticated users validated as corresponding to the non-automated online activity, wherein a communication identifier of a given NFT, of the minted NFTs, comprises an email address, a phone number, a direct message identifier, a social application identifier, or any combination thereof;
   transferring the minted NFTs to the user token wallets and appending one or more transfers to the one or more blockchains;
   receiving a request to verify a candidate communication identifier against the one or more blockchains;
   validating, via analyzing the one or more blockchains that manage NFTs comprising the minted NFTs, that at least one of the NFTs comprises the candidate communication identifier by traversing or querying the one or more blockchains, using the candidate communication identifier; and
   providing, based on the validating, an indication that the candidate communication identifier is verified, wherein the indication is based on the candidate communication identifier being non-automated.

2. The method of claim 1, wherein the candidate communication identifier comprises a phone number, a direct message identifier, a social application identifier, or any combination thereof.

3. The method of claim 1, wherein the candidate communication identifier comprises a social application identifier, and the social application identifier is validated as a non-automated account in response to the validating.

4. The method of claim 3, wherein the indication comprises a validation result that confirms the candidate communication identifier is validated against the one or more blockchains and comprises a non-automated account.

5. The method of claim 1, wherein verifying the candidate communication identifier comprises validating a user as an owner of the candidate communication identifier.

6. The method of claim 1, further comprising: providing, in response to validating a user as an owner of the candidate communication identifier, one or more additional communication identifiers or one or more electronic addresses owned by the user.

7. The method of claim 1, wherein,
an index of the one or more blockchains is maintained that represents the NFTs on the one or more blockchains, and
the analyzing the one or more blockchains is performed via traversing or querying the maintained index.

8. The method of claim 7, wherein the index is maintained via periodically validating the index against the one or more blockchains to maintain accurate representation of the NFTs.

9. The method of claim 1, wherein the online activity for the portion of the users is validated as non-automated, based on the monitored online activity comprising the web browser activity, by:
receiving logged web browser activity comprising websites visited, website actions taken, user click stream, or any combination thereof; and
analyzing the logged web browser activity via one or more trained machine learning models.

10. The method of claim 1, wherein the online activity for the portion of the users is validated as non-automated, based on the monitored online activity comprising the social media activity, by:
receiving logged social media activity comprising social media actions, user connections, social media content viewed, or any combination thereof, and
analyzing the logged social media activity via one or more trained machine learning models.

11. The method of claim 1, wherein the online activity for the portion of the users is validated as non-automated, based on the monitored online activity comprising the email or the messaging activity, by:
receiving logged email or messaging activity comprising emails or messages read, emails or messages sent, emails or messages read without reply, or any combination thereof, and
analyzing the logged email or messaging activity via one or more trained machine learning models.

12. A non-transitory computer-readable storage medium storing instructions that, when executed by a computing system, cause the computing system to perform a process for verifying a communication identifier using one or more blockchains, the process comprising:
monitoring online activity corresponding to users associated with requests of identity authentication, wherein the online activity comprises web browser activity, social media activity, email or messaging activity, financial activity, or any combination thereof;
authenticating user identities by validating that online activity corresponding to a portion of the users comprises non-automated online activity, wherein the online activity for the portion of the users is validated as non-automated based on the monitored online activity;
generating user token wallets for the portion of the users, in response to validating that the online activity corresponding to the portion of the users comprises the non-automated online activity;
minting, on one or more blockchains, multiple non-fungible tokens (NFTs) that each comprise a communication identifier corresponding to one of the portion of the authenticated users validated as corresponding to the non-automated online activity, wherein a communication identifier of a given NFT, of the minted NFTs, comprises an email address, a phone number, a direct message identifier, a social application identifier, or any combination thereof;
transferring the minted NFTs to the user token wallets and appending one or more transfers to the one or more blockchains;
receiving a request to verify a candidate communication identifier against the one or more blockchains;
validating, via analyzing the one or more blockchains that manage NFTs comprising the minted NFTs, that at least one of the NFTs comprises the candidate communication identifier by traversing or querying the one or more blockchains, using the candidate communication identifier; and
providing, based on the validating, an indication that the candidate communication identifier is verified, wherein the indication is based on the candidate communication identifier being non-automated.

13. The non-transitory computer-readable storage medium of claim 12, wherein the candidate communication identifier comprises a phone number, a direct message identifier, a social application identifier, or any combination thereof.

14. The non-transitory computer-readable storage medium of claim 12, wherein the candidate communication identifier comprises a social application identifier, and the social application identifier is validated as a non-automated account in response to the validating.

15. The non-transitory computer-readable storage medium of claim 14, wherein the indication comprises a validation result that confirms the candidate communication identifier is validated against the one or more blockchains and comprises a non-automated account.

16. The non-transitory computer readable medium of claim 12, wherein the online activity for the portion of the users is validated as non-automated, based on the monitored online activity comprising the web browser activity, by:
receiving logged web browser activity comprising websites visited, website actions taken, user click stream, or any combination thereof; and
analyzing the logged web browser activity via one or more trained machine learning models.

17. The non-transitory computer readable medium of claim 12, wherein the online activity for the portion of the users is validated as non-automated, based on the monitored online activity comprising the comprising social media activity, by:
receiving logged social media activity comprising social media actions, user connections, social media content viewed, or any combination thereof, and analyzing the logged social media activity via one or more trained machine learning models.

18. The non-transitory computer readable medium of claim 12, wherein the online activity for the portion of the users is validated as non-automated, based on the monitored online activity comprising the email or the messaging activity, by:
receiving logged email or messaging activity comprising emails or messages read, emails or messages sent, emails or messages read without reply, or any combination thereof, and
analyzing the logged email or messaging activity via one or more trained machine learning models.

19. A computing system for verifying a communication identifier using one or more blockchains, the computing system comprising:
one or more processors; and
one or more memories storing instructions that, when executed by the one or more processors, cause the computing system to perform a process comprising:
monitoring online activity corresponding to users associated with requests of identity authentication, wherein the online activity comprises web browser activity, social media activity, email or messaging activity, financial activity, or any combination thereof;
authenticating user identities by validating that online activity corresponding to a portion of the users comprises non-automated online activity, wherein the online activity for the portion of the users is validated as non-automated based on the monitored online activity;
generating user token wallets for the portion of the users, in response to validating that the online activity corresponding to the portion of the users comprises the non-automated online activity;
minting, on one or more blockchains, multiple non-fungible tokens (NFTs) that each comprise a communication identifier corresponding to one of the portion of the authenticated users validated as corresponding to the non-automated online activity, wherein a communication identifier of a given NFT, of the minted NFTs, comprises an email address, a phone number, a direct message identifier, a social application identifier, or any combination thereof;
transferring the minted NFTs to the user token wallets and appending one or more transfers to the one or more blockchains;
receiving a request to verify a candidate communication identifier against the one or more blockchains;
validating, via analyzing the one or more blockchains that manage NFTs comprising the minted NFTs, that at least one of the NFTs comprises the candidate communication identifier by traversing or querying the one or more blockchains, using the candidate communication identifier; and
providing, based on the validating, an indication that the candidate communication identifier is verified, wherein the indication is based on the candidate communication identifier being non-automated.

\* \* \* \* \*